Aug. 16, 1966  J. R. BRYSON  3,266,199
METHOD FOR FORMING SPONGES
Original Filed Oct. 14, 1963  2 Sheets-Sheet 1
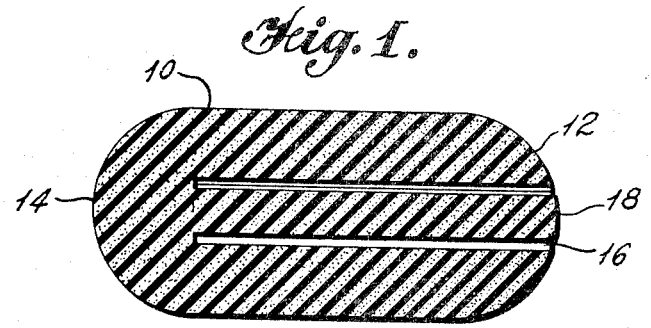
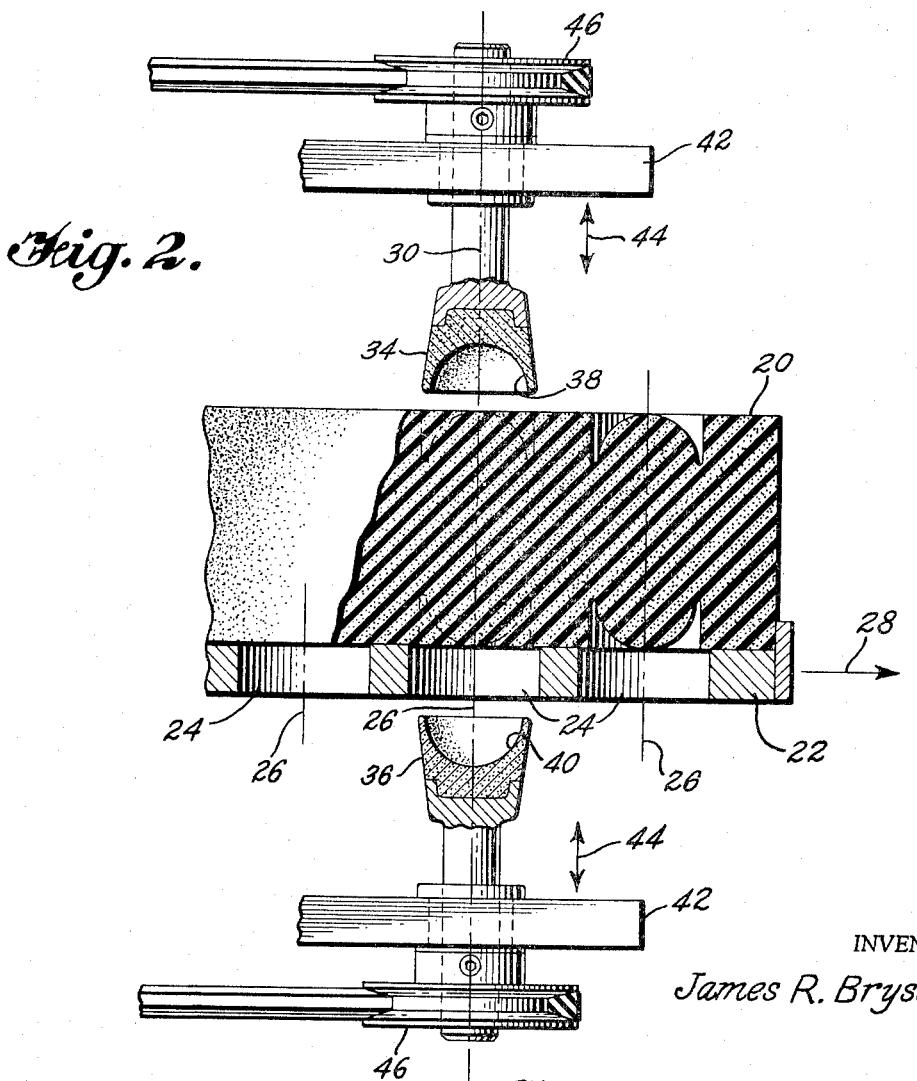
INVENTOR
James R. Bryson
BY Stevens, Davis, Miller & Mosher
ATTORNEYS

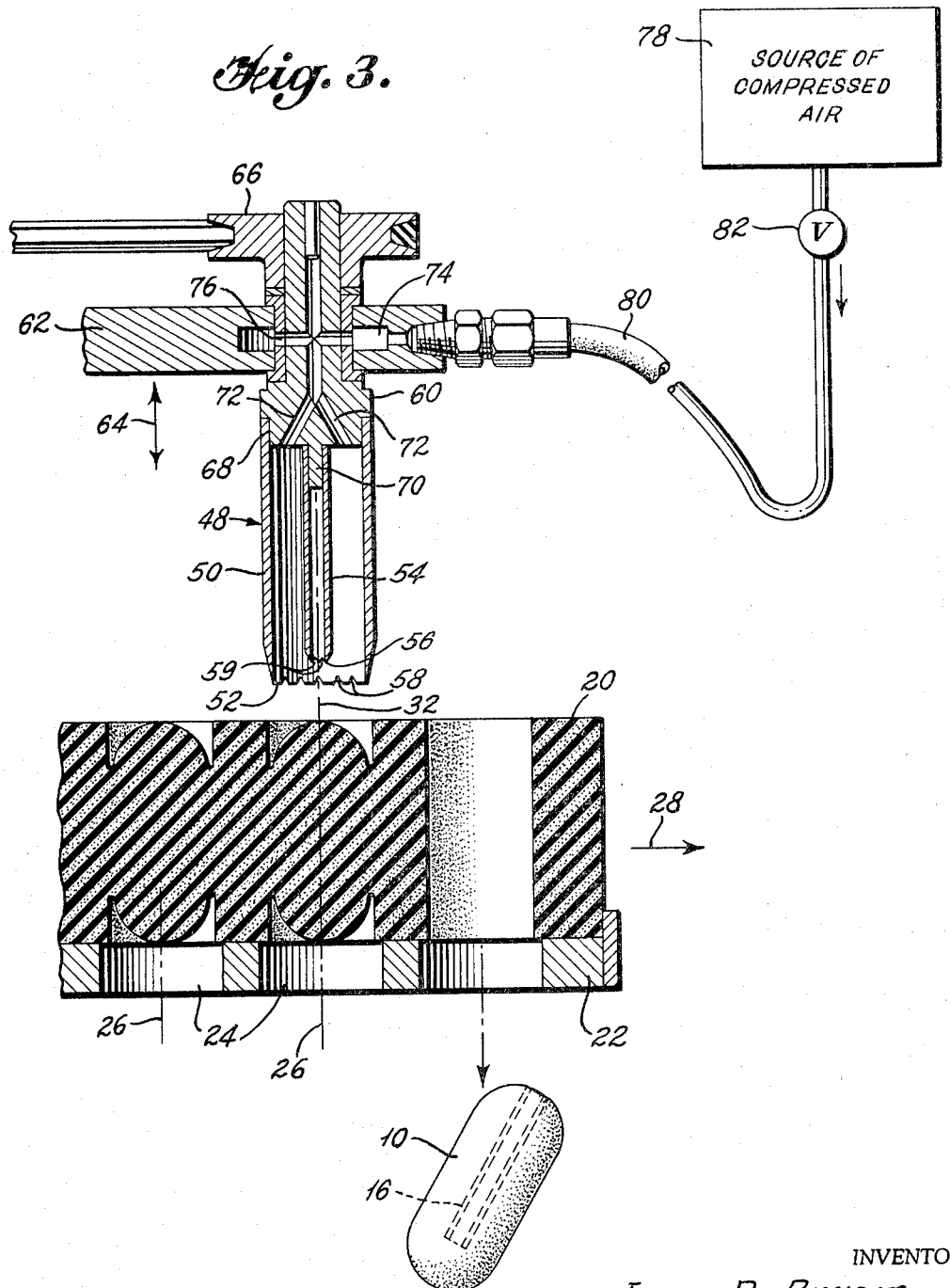

3,266,199
METHOD FOR FORMING SPONGES
James R. Bryson, Lutherville, Md., assignor to Washington Ethical Labs, Incorporated, Washington, D.C., a corporation of the District of Columbia
Original application Oct. 14, 1963, Ser. 315,963, now Patent No. 3,228,145, dated Jan. 11, 1966. Divided and this application July 20, 1965, Ser. No. 482,973
6 Claims. (Cl. 51—323)

This application is a division of my copending application Serial No. 315,963, filed October 14, 1963, now Patent No. 3,228,145, dated January 11, 1966.

This invention relates to a method for forming sponges, and more particularly it concerns the formation of small cylindrical sponges of the type especially adapted for use in vaginal cleansing instruments.

In Patent No. 3,228,398, dated January 11, 1966, there is disclosed a vaginal cleansing instrument in which a cylindrical sponge is mounted on the end of an elongated plastic handle. The material from which the sponge is made is polyurethane foam and preferably polyester-urethane foam to provide such physical characteristics as high flexibility, machinability, and a cellular structure which is partially opened and partially closed. Because of the intended use, it is essential that the cellular structure of the polyurethane foam be presented completely about the surface of the sponge. The required surface characteristics, i.e., the natural partially open and partially closed celled structure of the polyurethane foam, together with the rounded end, cylindrical shape of the sponge have led to considerable difficulty in the manufacture of the sponges. For example, the requirement that the cellular structure of the polyurethane be presented at the surface of the sponge precludes the use of molding techniques because of the formation of a non-absorbent film on the surface of molded polyurethane foam. Moreover, the exterior shape of the sponge presents difficulties. In this latter respect, particularly where the sponge is used in a vaginal cleansing instrument, it is imperative that the outside surface thereof be smooth or characterized by continuous curvilinear surfaces without any sharp or jagged edges. Accordingly, conventional shaping techniques used with polyurethane foam are either ineffective in the production of the required ultimate shape or require so much care and time in their execution as to make them impractical.

Accordingly, a principal object of the present invention is to provide a new and unique method for the formation of sponges, particularly sponges used in vaginal cleansing instruments and by which the problems heretofore experienced in their manufacture are effectively and substantially overcome.

A further object of this invention is to provide a method by which the formation of sponges of the type referred to may be effected in an economical and yet expeditious manner.

A further object of the present invention is to provide a method for the manufacture of cylindrical sponges useable in vaginal cleansing instruments which results in the sponge having superior physical characteristics.

In general, the foregoing objectives are accomplished by machining a slab of foam material to remove portions thereof leaving the shaped sponge article remaining. In this manner, the cellular structure on the interior of the foam slab is presented without change on the surface of the article. The machining is carried out by first abrading the end portions of the sponge to be formed about an axis extending across the slab thickness. Hence, a pair of abrading wheels having the desired surface characteristics and rotating about the axis of the sponge to be formed may be brought against opposite sides of the slab simultaneously. Having thus formed the end portions of the sponge in the slab of foam material, an annular cut is made concentric with the axis of the sponge across the width of the slab. Care is taken to index the annular cutting means with the slab so that the cylindrical sides formed by the annular cut are continuous with or tangential to the abraded curved ends. As a further incident to the present invention, an axial handle mounting aperture may be formed simultaneously with the formation of the cylindrical cut by forming an annular cut of smaller diameter also concentric with the axis of the sponge from one end thereof through to a point short of the thickness of the slab. In this manner, the aperture will be formed with a tongue extending from its base centrally outwardly to be compressed upon mounting the sponge upon a handle in accordance with the invention described in accordance with Patent No. 3,228,398. The apparatus for forming the annular cuts is preferably in the form of a cylindrical cutting member having an annular cutting edge on one end and rotatable about a central axis. The cutting member is movable into the slab of foam, and upon such movement the shaped sponge article will be contained within the cylindrical cutting member. To eject the article, compressed air is fed to the interior of the cutting member.

A more complete understanding of the present invention, together with other objects and further scope of applicability may be had from the detailed description following below, taken in conjunction with the accompanying drawings, wherein:

FIG. 1 is a cross-section of the shaped sponge article formed by the method of this invention;

FIG. 2 is a fragmentary cross-section illustrating one phase of the sponge forming method thereof; and FIG. 3 is a fragmentary cross-section illustrating a further phase of the method thereof.

Referring now to the drawings, and particularly to FIG. 1 thereof, a sponge useable with the vaginal cleansing intsrument disclosed in Patent No. 3,228,398 is illustrated as having a cylindrical body portion 10 with inner and outer rounded or substantially semi-spherical ends 12 and 14, respectively. As above mentioned, the material from which the sponge is made is polyurethane foam and preferably a polyester-urethane foam. While this material is particularly suitable for use with the instrument disclosed in Patent No. 3,228,398, it will be appreciated that the method of the present invention is applicable to other similar materials. A handle mounting aperture 16 extends from the inner end 12 to a point along the length of the sponge short of the outer end 14. The aperture is as shown in the form of an annulus to define a central projecting tongue 18. The tongue functions to provide a compressed mass of foam material near the outer end 14 when a handle (not shown) is inserted into the aperture 16, as described in Patent No. 3,228,398.

As shown in FIGS. 2 and 3 of the drawings, the formation of the sponge illustrated in FIG. 1 is carried out by mounting a slab of foam material 20 on a carriage 22 having a plurality of apertures 24 on uniformly spaced center lines 26. The apertures 24 are of a diameter to be somewhat larger than the diameter of the sponges to be formed and also, the carriage is arranged for movement in the direction of the arrow 28 in increments corresponding precisely to the spacing between the center lines 26.

A pair of working stations are positioned along the length of carriage travel to operate about fixed axes 30 and 32 spaced from each other a distance to accommodate precise alignment between the aperture center lines 26. While it is preferred that the axes 30 and 32 be spaced the same as the spacing between the aperture center lines 26, it will be appreciated that this spacing may be a multiple of the spacing between the center lines 26. Thus, by means of a detent arrangement (not shown) the carriage may be brought to rest after each increment of travel so that the center lines 26 of the aperture become successively aligned with the station center lines or axes 30 and 32, respectively.

At the station defined by the axis 30, a sponge end forming apparatus is positioned and as shown in FIG. 2, this apparatus includes a pair of cup-shaped abrading elements 34 and 36 having concave, semi-spherical abrading surfaces 38 and 40. The abrading surfaces, as shown, are integral with the elements 34 and 36 but it is contemplated that the surfaces 38 and 40 in some applications, may be abrasive metal particles, emery cloth, sandpaper and the like secured such as by an adhesive to the elements 34 and 36. Also, although the semi-spherical shape of the surfaces 38 and 40 is preferred because of the intended use of the sponges to be formed, other shapes defined by surfaces of revolution may be employed. Each of the abrading elements is journaled for rotation about the axis 30 in a support 42 movable in the direction of arrows 44 for reciprocation along the axis 30. Pulleys 46 are provided by which torque may be transmitted to drive the elements 34 and 36.

At the station defined by the axis 32, a rotatable cutting tool generally designated by the reference number 48 is positioned. The cutting tool includes an outer cylindrical cutting member 50 having a cutting edge 52 on the lower end thereof and an inner cylindrical cutting member 54 having a cutting edge 56 also on its lower end. The cutter members 50 and 54 may be of any suitable metal capable of withstanding the heat involved in cutting the foam material and are preferably formed with serrations 58 and 59, respectively, at spaced intervals determined by speed, material and size of cut diameter to provide a clean smooth cut. The cutter members 50 and 54 are both supported on a common hub 60 journaled for rotation about the axis 32 in a supporting frame 62 reciprocable in the direction of the arrow 64 by an amount sufficient so that the cutting edge 52 may be moved through the thickness of the slab 20. A pulley 66 is provided to transmit a rotational driving torque to the hub 60 and thus to the cutter members 50 and 54. Although the manner in which the cutter members are mounted on the hub may vary in practice, it is essential that they be mounted so that the annulus between the two cutter members is essentially smooth. Hence, the outer cutter member 50 is press fit over an undercut portion 68 of the hub 60 whereas the inner cutter member 54 is press fit on an axial extension 70 of the hub.

To eject the sponge from the cutting tool 48 and as well to effect a measure of cooling, the hub is formed with air passages 72 in communication with a chamber 74 in the support 62 by way of radial ports 76. The chamber, in turn, is supplied with compressed air from a suitable source designated at 78 by way of a flexible conduit 80 having a valve 82.

The manner in which the apparatus described above operates to carry out the method of the present invention may now be understood. With the slab 20 positioned on the carriage 22, the abrading elements 34 and 36 after achieving rotational speed are brought against opposite surfaces of the slab along the axis 30 to form the semi-spherical convex end configurations of the sponge. Thereafter, the elements are withdrawn and the carriage is moved until the partially formed portion of the slab is aligned with the axis 32. At this point, the cutter member 48 having been rotating at the proper rotational velocity is lowered to form inner and outer annular cuts by means of the inner and outer cutter members 54 and 50, respectively. The diameter of the cutting edge 52 is selected so that the foam material is cut on a cylinder meeting the semi-spherical end portions formed by the abrading elements 34 and 36 precisely at a tangent of the curved end portion. In this manner, a smooth continuously curvilinear external surface is formed on the sponge. Also, the inner cutter member 54 will operate to form the handle mounting aperture 16 in the sponge, together with the extending tongue 18 shown in FIG. 1.

When the cutter 48 has fully penetrated the slab 20 and thus completed the formation of the sponge, the sponge will be lodged in the annulus between the inner and outer cutter members. At that point, the valve 82 will be opened to permit compressed air to flow into the upper portion of the annulus and eject the completed sponge downwardly through the aperture 24 whose center line 26 is aligned with the axis 32. Then, after the cutter 48 has been raised clear of the slab 24, the carriage is moved through another increment of distance and the cycle repeated. It will be understood that the abrading elements 34 and 36 will be operated concurrently with the cutter 48, the abrading elements operating about the axis 30 at the first station simultaneously as the cutter element operates to form the cylindrical body portion of the sponges at the station defined by the axis 32.

Thus, it will be appreciated that the present invention affords an extremely effective method for the formation of sponges from slabs of foam material and by which the above mentioned objectives are fully achieved. Also, it will be appreciated that while the method of this invention has been described as having particularly utility with respect to the manufacture of sponges of the type used in vaginal cleansing instruments, it will be apparent that the invention will have applicability in other fields. Also, since many modifications and variations in the invention are possible, it is to be distinctly that the foregoing description is illustrative only, not limiting, and that the true spirit and scope of the present invention is to be determined by reference to the appended claims.

The invention claimed is:

1. The method of forming a cylindrical sponge having rounded portions at both ends comprising the steps of machining opposite sides of a slab of foam material about the axis of the sponge to form the rounded end portions, and making an annular cut through the slab with an annular cutting edge rotating about the axis of the sponge.

2. The method of forming a cylindrical sponge to be mounted on a handle for use as a vaginal cleanser, said method comprising the steps of: abrading opposite sides of a slab of foam material to form convex portions about an axis extending across the thickness of said slab, making an inner annular cut concentric with said axis from one side of said slab to a point short of the other side thereof to form a handle aperture having a tongue projecting centrally from its base, and making an outer annular cut also concentric about said axis and throughout the thickness of said slab.

3. The method of forming a cylindrical sponge having at least one shaped end portion from a slab of foam material having a thickness at least equal to the length of sponge to be formed comprising the steps of: indexing said slab relative to a first axis to align said first axis with the axis of the sponge to be formed, said axes extending in the direction of slab thickness, machining at least one side of said slab about said first axis to form said shaped end portion, indexing said slab to align the axis of the sponge to be formed with a second axis spaced from said first axis, and making an annular cut concentric with said second axis through said slab to separate the sponge from said slab.

4. The method of forming a cylindrical sponge having semi-spherical shaped end portions from a slab of foam material having a thickness at least equal to the length of sponge to be formed comprising the steps of: indexing said slab relative to a first fixed axis to align said first axis with the axis of the sponge to be formed, said axes extending in the direction of slab thickness, machining opposite sides of said slab about said first axis to form said semi-spherical end portions, indexing said slab to align the axis of the sponge to be formed with a second fixed axis, and making an annular cut concentric with said second axis through said slab the diameter of said annular cut being equal to the diameter of the semi-spherical end portions whereby the cylindrical surfaces formed by said annular cut are tangential to the semi-spherical end surfaces.

5. The method recited in claim 4 including further the step of forming a central handle-receiving aperture concentric with said second fixed axis simultaneously with making said annular cut.

6. The method recited in claim 4 wherein the opposite sides of said slab are abraded about said first axis to form the semi-spherical end portions.

References Cited by the Examiner

UNITED STATES PATENTS

| | | | |
|---|---|---|---|
| 146,901 | 1/1874 | Harrison et al. | 77—69 X |
| 876,852 | 1/1908 | Watson | 77—69 X |
| 1,681,249 | 8/1928 | Mulholland | 51—80 |
| 1,817,554 | 8/1931 | Griswold | 51—46 |
| 2,551,156 | 5/1951 | Polk et al. | 146—236 |
| 2,599,770 | 6/1952 | Marcerou | 77—69 X |
| 3,063,141 | 11/1962 | Scholl | 51—281 X |

LESTER M. SWINGLE, *Primary Examiner.*